Patented Apr. 16, 1929.

1,709,801

UNITED STATES PATENT OFFICE.

CARL MÜLLER, OF CHARLOTTENBURG, NEAR BERLIN, GERMANY, ASSIGNOR TO KARL MEY, OF BERLIN, GERMANY.

MANUFACTURE OF THIN METALLIC FOILS.

No Drawing. Application filed March 9, 1925, Serial No. 14,317, and in Germany March 4, 1924.

My invention relates to the art of making metallic foils, films or leaves and the prime object of my invention is to manufacture foils or leaves of the stated kind which are of such extreme thinness as never have been made hitherto.

Very thin foils particularly of metallic nature which are free of distortion are desirable and required especially in the manufacture of telephones and microphones, controlling devices for use in electric image transmitting devices, electric resistances, radio-receivers for use in bolometers and thermo-electric piles, windows for use in discharging tubes, apparatus for testing electric radiations, electrometers and galvanometers, and for various chemical purposes such as semi-pervious diaphragms and the like.

By the methods as hitherto practised metallic foils are produced which are not thinner than $.5\mu$, as regards platinum, $.1\mu$ as regards gold and $1\mu$ equal to 0.001 mm. as regards nickel and the object of my invention is, as above intimated, to produce foils of a by far greater thinness such as nickel and gold foils of a thickness like $.01\mu$ or .00001 mm., which are very remarkably transparent or pervious to light.

From a general aspect I manufacture the thin foils, according to my invention, in a manner similar to that of the old art, that is to say, by preparing or producing, electrolytically by preference, several layers or strata of different materials in superposed relationship so as to obtain a compound stratified sheet or body composed of a layer of the foil metal, that is the metal or alloy of which the foils are to be made, and of a protective layer or layers of foreign material or materials and subsequently removing all foreign material covering the foil material in any suitable way, preferably by an etching operation. It is found, however, that in case of making the foil layer very thin, the same is liable to break under the influence of the etching operation and towards the end of such operation, and, to be injured or even break at the manipulation of removing the same from the etching liquor at the end of the etching operation. For these reasons it is impossible to manufacture, according to the present state of the art, foils of extreme thinness.

The dominant idea of my invention is to remedy this defect and I accomplish this purpose by making the protective layer covering the foil layer on one side or the two protective layers on both sides of the foil layer far thinner than they were hitherto made. After much study and research I have found that the comparatively great thickness of the protective layers hitherto employed in the art of making foils, involves detrimental inner tensions in the foil body which render the foil infirm and frail so that the same is very liable to break during the etching operation and during handling and the thickness thereof cannot be reduced to a further degree than hereinbefore intimated.

According to my discovery I eliminate the defects of the old art by employing protective layers of a reduced thickness as compared with the prior art. Supposing, for example, a nickel foil of a thickness of $.04\mu$— is to be produced I take a supporting sheet of nickel as available on the market and produce or precipitate thereon electrolytically a thin copper layer, say of $5\mu$ thickness, and on the thus made copper stratum I precipitate electrolytically a thin layer of nickel which is intended to form the final nickel foil, say of $.04\mu$ thickness whereupon I precipitate on the latter a copper coating of say 3 to $5\mu$ thickness.

In the further procedure of my method I strip off from the supporting nickel sheet the thus obtained compound sheet and subsequently I preferably provide a reinforcing frame on the marginal or edge portions of the remaining compound sheet which frame will greatly assist in safely handling and drying the foil following the etching operation. A frame of the kind may consist, for example, of copper, nickel or copper-plated nickel and may be produced by electrolytic precipitation or mechanically as by stamping, or by attaching to the rim portions of the compound sheet suitable reinforcing members which may be of either metallic or non-metallic nature.

A larger number of such framed foils may be made at the same time and in coherence with each other from larger sheets or leaves of a compound strip of the described kind. With the aid of the frame the thin compound sheet then is placed in an electrolytic cell filled with a weak oxidizing ammoniacal copper solution to serve as an anode therein, so that the two outer copper layers of the sheet will be dissolved and only the thin inner nickel layer forming the foil will remain in the frame. The foil thus obtained can be easily removed from the electrolytic liquor and upon having been treated in a suitable cleaning operation by means of appropriate baths the foil is subjected to a drying process. The rim portions of the reinforcing frames are preferably made of increasing thickness toward the outer edges of the foil.

In the foregoing it has been supposed that the layer which is intended to serve as a foil, is embedded between two protective layers. It is, however, possible to apply only a single protective layer or coating on one side or face of the foil layer. But it is advisable to apply a protective layer on both sides mainly for the reason that in this case one may start by depositing first a protective layer on a supporting plate which is desirable in order to obtain a layer of regular configuration and because the removal of the compound sheet from the supporting plate involves a considerable strain in the sheet which only to a very small degree affects the foil layer if it is embedded in the neutral zone intermediate the two outer layers. Also as regards the removal of the protective layers by means of an electrolytic bath the provision of protective layers on both sides of the sheet or foil body is desirable for the reason that the sheet will be attacked evenly on both sides in such a case.

In some cases it will be advisable to use a supporting plate or sheet consisting of a metal or alloy that permits of being easily removed by means of an etching operation so that a mechanical separation of the compound sheet from the support will be avoided. For example, a strong zinc foil may be employed for the purpose and the process of constructing thereon the compound sheet will consist, as hereinbefore described, in electrolytically depositing a thin copper layer on the one face of the zinc foil, thereafter a thin nickel layer—if nickel be the foil metal—on the copper layer and finally, another thin copper layer on the nickel layer. A supported compound sheet of the kind can be treated on the one face or side with an etching liquor in order to remove the supporting zinc layer therefrom, whilst the subsequent operations for removing the two copper layers are carried out in the same manner as above described.

In some cases it is desirable to manufacture a foil composed of two individual layers in order to obtain a composite foil of particular density. To this end I produce two compound bodies or sheets, as hereinbefore described, each having a thin foil layer forming one face or side thereof. The two foil layers may consist of different metals. I then place one compound sheet on top of the other one with the foil layers contacting, whereupon I remove the two protective layers by means of electrolysis or in any other suitable way.

The above described method of manufacturing composite foils may be improved by applying to the outer face or side of at least one of the two compound sheets a thin layer of a uniting substance which may be a readily alloyable metal such as tin or gold, and then uniting the two compound sheets as described preferably in vacuo and with the aid of heat, whereby an intimate connection or adhesion will be ensured.

In lieu of making a composite foil from two separate compound sheets, as above described, two foil layers may be produced on one and the same protective layer or sheet in superposition, for example, on a thin layer or sheet of a comparatively strong metal, such as nickel, a layer of a highly conductive metal or a layer of a light metal or any alloy.

It is not necessary that the composite foil shall comprise two layers all over its area. It will be rather sufficient in some cases to give only certain portions of the foil a composite character. Foils of this partially composite type are particularly useful in telephone diaphragms and the like, where a superposed layer of magnetic material must be provided.

In manufacturing foils for use in diaphragms of this kind superposed layers comprising a permanently magnetic material may be magnetised, while still being a part of the compound sheet, that is to say, prior to the separation of the protective layers from the foil layer or a magnetic field may be applied during the precipitation of the material to be permanently magnetised for directing purposes. This is very suitable since it is very difficult to magnetise the steel layer on the finished or free foil without injuring the latter.

The superposed layer may be given, according to the special purposes the foil or the diaphragms to be cut therefrom are intended to serve, any desired shape. For example, it may have the form of a central enlargement for the current conductor to be attached thereto, prior to the separation from the protective member, or the form of a spiral line or strip made of a highly conductive material whilst the foil itself consists of a poor conductor. In some cases it may be desirable to produce diaphragms in which for rigidity's sake, the portions mainly exposed to strain, such as the rim portions, shall be enlarged or in which the foil surface is provided with reinforcing net-like veins or ribs, which may consist of a different material or of the same material as the body of the foil. Reinforcing enlargements of the kind may also be formed on the foil or the diaphragm by only partially etching of the protective layer so that portions of the latter will remain on the foil at certain places thereof after the etching operation has been finished. This may be accomplished either by protecting certain places or parts of the protective layer by means of a protective coat to be applied thereto, or in any other suitable way, or by subjecting such places or parts to an etching action of reduced effect, or by giving the protective layer different thickness at different places or parts so that the etching liquor will not penetrate to the bottom at the thicker places or parts of the protective layer.

The superposed layers of the foils may be made to be smooth and bright as a mirror so as to have reflecting properties, which is a very valuable property in case of making diaphragms adapted to influence or reflect radiations of light and the like. Layers of the kind may be produced, if desired, on the finished or free foil by means of galvanic, thermic or chemical procedures, for example by evaporation, electric atomization, decomposition of gaseous metallic compounds, and they may be combined with thin organic or inorganic protective coats such as coating of resinous nature or the like.

In case of employing totally or partially composite foils the nature of the material from which they are built up is very important. Foils having a spirally wound superposed layer may be used e. g. as current conductors having two spirals, the one within the other one, or connected for return in the center, and in this modification a spiral layer may be provided on both sides of the foil with an insulating layer between them so that the current may be conducted to the center from the outside and therefrom away to the outside, if the spirals are conductively connected with each other in the center. The winding direction of the two spirals apparently must be different in order to ensure increased magnetic coil effect.

A foil adapted for use in connection with the construction of highly sensitive thermoelectric couples and piles of very little mass, may be obtained by depositing upon a protective layer two metals which are highly distinguished from each other in regard to thermo-electric properties, so as to overlap each other to a certain degree, covering the thus formed compound structure, if required or desired with another protective coating which may be of non-conductive, organic nature, and removing the support as required.

As regards the quality of the foils and diaphragms to be manufactured according to my method the condition of the surface of the support to which the foil layer had been applied, is of importance. If it is desired to produce particularly elastic foils it will be advisable to give the protective layer to which the foil metal is to be deposited electrolytically a certain surface profile, for example, of a slight wave or of a hill and valley type. In some cases the unevenness or roughness of the surface as, for example, found in mat or tarnished electrolytic deposits, will be sufficient for the aim in view.

In other cases, however, the foil may require a profile of a more complicated nature. Instead of producing the foils on a figured protective layer, the compound layer or sheet from which the foil is to be separated, may be stamped in a manner to bring different portions of the compound sheet into different planes. Upon subjecting the thus stamped sheet to the operation for the removal of the protective layers from the foil layer, foils are obtained with different portions or sections lying in different planes. As in foils of this kind the portions intermediate between those in the one plane and those in another plane, that is to say, the transition portions are subjected to particular strain, it is advisable to provide reinforcements or enlargements at those places or portions by only partially etching off or otherwise removing the protective layers at the stamping edges of the compound sheets so that parts of the protective layers will remain on the foil, or alternatively by giving the protective material a greater thickness at such places or portions, or by using especially shapable materials or a stamping shape of especially reinforcing action. Diaphragms of this type may be used for telephones and the like.

In the foregoing my method of manufacturing foils in the wet way has been described and this method starts from compound sheets each comprising a plurality of layers that is to say, the foil layer and protective layers, the latter being removed by dissolving the same in appropriate liquors. In the method described the reduction of the thickness of the protective layer or layers affords the means for obviating the destruction of even very thin foils during the etching or other dissolving operation.

Now, it is possible to remove the protective layers from a very thin foil layer in a dry way so that the heavy strain to which the freed or finished foil is exposed due to the surface tension of a liquid at the time of taking the same out of the liquid and drying the same will be avoided.

My invention, therefore, also comprises a dry method of manufacturing foils of the stated type, consisting in starting from compound sheets, as hereinbefore described and removing the protective layer or layers by gasifying the same with the aid of suitable means or agents. The expression "gasifying" includes as well transforming into gaseous reaction products as simple "vaporization" and the substances or materials employed in this modification of my method for the protecting purpose, include as well metals as non-metallic materials, particularly of the kind adapted to be readily sublimated. Instead of gasifying the protective layers, preferably in vacuo, or atomizing the same by means of an electric current, the said layers may be chemically transformed through the action of suitable gases so as to form gaseous products which may be locally given different characters through local influences. In all of these cases it is not necessary to lift the foil from a liquid and the foil, therefore, is not exposed to the strain due to the surface tension of the adhering liquid.

Supposing it is desired to produce a very uniform gold diaphragm of extreme thinness. I precipitate on one side of a thin nickel sheet or layer a deposit of gold of the desired thickness and, if required or desired, I precipitate on the thus obtained gold film another thin layer of nickel, whereupon I expose the thus obtained compound sheet to the action of monoxide of carbon whereby the two nickel layers will be consumed, according to a chemical reaction which is well known per se, to form gaseous nickel carbonyl whilst the gold film will remain unaffected.

It is also possible to combine the wet method with the dry method and the thus combined method may be carried out so as to start from a compound layer or sheet with the foil metal sandwiched between two protective layers, as hereinbefore described, to completely remove one protective layer in the wet way so that only a very thin protective layer will remain on the opposite side of the sheet which assists in rendering the sheet sufficiently rigid for handling, and to then remove this thin protective layer in the dry way. It will be seen that also in this manner the strain on the foil due to the action of a liquor is avoided.

As hereinbefore mentioned, it is essential that the material or nature of the foil is adapted to the special use in question. The manufacture and the subsequent preparation of the compound layer or sheet is very simple in case the said sheet is made of metals or alloys adapted to be deposited electrolytically. In some cases, however, foils are wanted which are not electric conductors, particularly such provided with a superposed conductive layer of metallic nature. Foils of this kind may likewise be made from metallic compound layers or sheets as above described by chemically changing the resulting foil chemically. For example, a nickel foil may be oxidized in any suitable way whereby the same will become a bad or low conductor, but at the same time highly pervious to light.

A non-conductive diaphragm of this kind can be rendered conductive by means of reduction, it being at the operator's will to limit either the oxidizing or the reducing operation in order to obtain foils which may be used as high ohmic resistances of high load-capacity or as electric conducting systems of extremely little mass or as a means for influencing optical occurrences owing to selected transparent places or portions therein. Obviously such transparent places or portions may be in the form of corresponding openings in the foil provided at the time of making the foil or to be made at any later time. If desired or required the edges of such openings may be enlarged or otherwise reinforced.

Regarding the extreme thinness of the foils under consideration it is difficult to produce layers of a comparatively large area which are practically free from pores. Hence if foils are wanted which are practically free from pores, particular arrangements must be provided and specific requirements must be complied with in order to ensure freedom from pores. A means adapted for use to this end has been mentioned hereinbefore to consist in making the foil from two or several separated layers.

A further means for the same purpose consists in closing the pores after the foils or diaphragms have been manufactured as above described. This may be done according to my invention, by causing a fluid medium, such as a gas. to flow through the finished foil in order to close the pores thereof. To this end the gaseous medium must be particularly adapted to close the pores by means of solid bodies of infinitesimal smallness distributed in the medium and moved by the same towards the pores so that the latter will be closed. The pores may be closed, however, in any other suitable way say by chemically depositing solid bodies at and within the pores. A means adapted for use in this latter way consists in sucking nickel carbonyl through the pores of the foil so that, if suitable temperature conditions prevail, the carbonyl gas will be decomposed and metallic nickel will be formed which acts to close the pores. Another way of closing the pores consists in causing two fluids or gases to meet in the plane of the foil and to react in or in the vicinity of the pores so as to deposit therein solid bodies which act to close the pores.

While I preferably form the film forming layer or layers by electrolytic deposition, as previously stated, I may, of course, have recourse to other forms of deposition, as for instance, to cathodal spraying, thermal evaporation and deposition of the vapors, or in any case by building up by the accretion of particles of substantially atomic or molecular size. In order to more clearly define this feature in the claims, I use the term "deposition" as including all forms of formation in which minute particles are accreted to produce the film.

What I claim is:—

1. A method of manufacturing thin foils of appreciable extent consisting in producing by superposition a compound sheet of three layers wherein a coherent foil forming layer produced by deposition and of desired thinness is sandwiched between two further layers and removing the said two outer layers from the intermediate foil forming layer by molecular decomposition, the said protective outer layers being of sufficient thinness to avoid detrimental stress being exerted on the foil layer on removal of the protective layers.

2. A method of manufacturing thin foils, consisting in producing a compound sheet comprising a plurality of individual layers one of the foil metal produced by deposition and having a corrugated surface, and treating the said compound sheet in a manner that the covering of the foil layer will be molecularly decomposed so as to isolate a foil with a corrugated surface.

3. The method of producing thin foils which comprises forming a compound sheet of two thin and superposed metallic layers by deposition, one layer being deposited to constitute the metal foil which is to be isolated, and the second layer being deposited from metal of the iron group to provide a cover layer for said foil layer, and subjecting said compound sheet to a dry treatment to transform the metal of said cover layer into a gaseous reaction product, thereby isolating the layer of foil metal as a foil.

4. The method as set forth in claim 3, wherein said dry treatment of the compound sheet for isolating said foil layer comprises a treatment with carbon monoxide.

5. A method of manufacturing thin foils, consisting in producing two compound sheets comprising each a thin layer of foil material and a layer of a different material uniting the said two sheets so that the two layers of foil material are in intimate contact with each other, and decomposing molecularly the outer layers of the thus formed double compound sheet, so as to isolate a compound foil composed of two firmly united individual layers.

6. A method of manufacturing thin foils, consisting in producing a compound sheet comprising a plurality of individual layers one of foil metal produced by deposition, subdividing the foil metal layer into a plurality of zones substantially separated from each other by applying framing sections thereto and treating the compound sheet in a manner that the covering of the foil layer will be molecularly decomposed except the framing portions at the edges of the individual zones.

7. A method of manufacturing thin foils, consisting in producing a compound sheet comprising a plurality of individual layers one of foil metal produced by deposition, subdividing the foil metal layer by applying thereto reinforcing frames which form a plurality of substantially separated zones positioned substantially in planes laterally displaced with relation to each other, and treating the compound sheet in a manner that the covering of the foil layer will be molecularly decomposed except the framing portions at the edges of the individual zones.

8. A method of manufacturing thin foils, consisting in producing a compound sheet comprising a plurality of individual layers including one of the foil metal produced by deposition and applying material to form a reinforcing frame thereon, the sections of said reinforcing frame gradually thickening from inside to outside the surrounded layer surface, and treating the thus shaped compound sheet in a manner that the covering of the foil metal layer will be molecularly decomposed, so as to isolate the thin foil in framed condition.

9. A method of manufacturing foils having a thickness of less than $.05\mu$ which consists in forming on a support by deposition a layer having a thickness of less than $10\mu$ and on the said layer by deposition a layer representing the film, isolating the two layers as a unit from the support and removing by molecular decomposition the layer previously next to the support from the other layer.

10. A method of manufacturing thin foils, which consists in forming on a support by deposition three layers in superposition, the intermediate layer representing the foil to be obtained and having a thickness not greater than $1\mu$, the outside layers having a thickness of less than $10\mu$ each, isolating the three layers as a unit from the support and removing by molecular decomposition the two outside layers.

11. A method of manufacturing thin foils, which consists in forming on a support by electrodeposition three layers in superposition, the intermediate layer representing the foil to be obtained and the outside layers having a thickness of less that $10\mu$ each, isolating the three layers as a unit from the support and removing by molecular decomposition the two outside layers.

12. As a product of manufacture a metallic foil of extreme thinness provided with a frame intimately secured to said foil and extending around the peripheral edge thereof.

13. As a product of manufacture a metallic foil of extreme thinness provided with a surrounding frame gradually thickening from inside to outside the foil surface surrounded thereby.

14. As a product of manufacture a thin foil having reinforcing material applied thereto and subdividing the foil into a plurality of framed zones which are separated from each other by said applied reinforcing material.

15. As a product of manufacture a thin foil subdivided into a plurality of framed zones and certain of the frames defining said zones being positioned in planes laterally displaced with relation to each other.

16. As a new product of manufacture, an unbroken, coherent film of metal having a thickness not greater than 1µ, and substantially identical with metal foil made by the process which comprises forming upon a support by deposition three layers in superposition, the intermediate layer constituting the thin foil to be isolated, and the outer layers being deposited to a thickness of not exceeding 10µ each, isolating the three layers as a unit from the support, and removing by molecular decomposition the two outside layers.

17. As a product of manufacture, the combination with a support, of three layers of different materials in superposition upon the support, the intermediate layer being of base metal and having a thickness of less than 1µ and the outer layers having each a thickness of less than 10µ.

18. A product according to claim 17 in which the outer layers are also of metal.

19. In the manufacture of foils having a thickness substantially less than 0.1µ by depositing the film-forming material upon a protective support of a different material, the method which comprises forming the protective support as a layer of such thinness that the subsequent separation thereof from the deposited foil layer will not establish detrimental stresses in the foil layer.

20. In the manufacture of thin foils, the steps which comprise forming a protective layer upon a support, depositing upon said protective layer two different metals to form a composite foil layer having sections in which the two metals overlap, forming a protective layer upon said compound foil, removing the several layers as a unit from said support, and removing said protective layers from said composite foil layer by molecular decomposition, said protective layers being formed of such thinness that the removal of the said protective layers will not establish detrimental stresses in the foil.

In testimony whereof, I affix my signature.

Dr. CARL MÜLLER.